No. 696,265. Patented Mar. 25, 1902.
A. PEREZ.
SAW ADAPTED ESPECIALLY FOR FELLING TREES AND CUTTING THEM UP.
(Application filed May 6, 1901.)
(No Model.) 2 Sheets—Sheet 1.
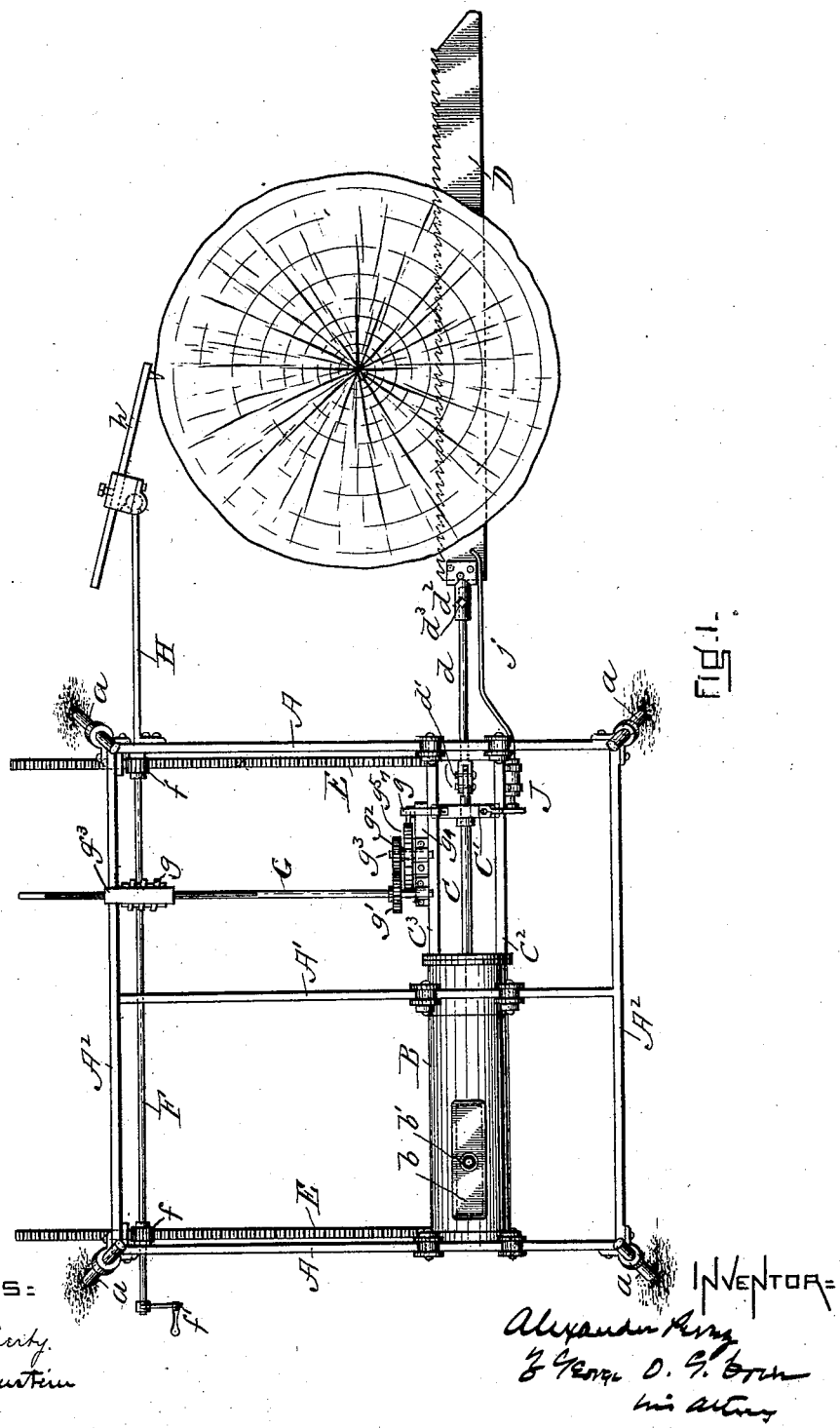

No. 696,265. Patented Mar. 25, 1902.
A. PEREZ.
SAW ADAPTED ESPECIALLY FOR FELLING TREES AND CUTTING THEM UP.
(Application filed May 6, 1901.)
(No Model.) 2 Sheets—Sheet 2.
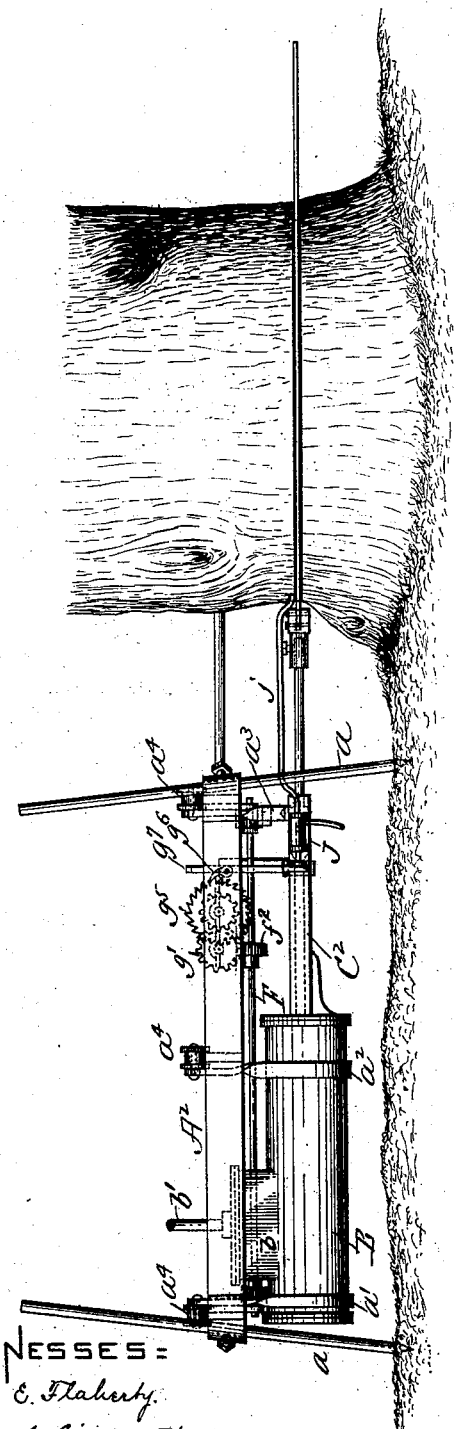
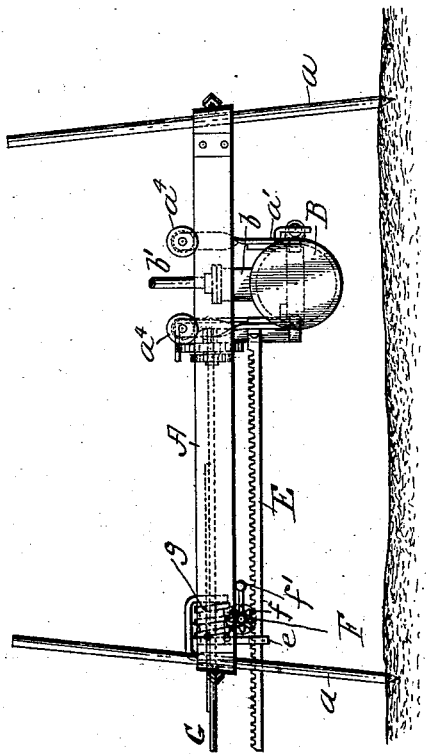

UNITED STATES PATENT OFFICE.

ALEXANDER PEREZ, OF BOSTON, MASSACHUSETTS.

SAW ADAPTED ESPECIALLY FOR FELLING TREES AND CUTTING THEM UP.

SPECIFICATION forming part of Letters Patent No. 696,265, dated March 25, 1902.

Application filed May 6, 1901. Serial No. 58,876. (No model.)

*To all whom it may concern:*

Be it known that I, ALEXANDER PEREZ, a citizen of Cuba, now living in Boston, in the county of Suffolk and State of Massachusetts, have invented a new and useful Improvement in Saws Adapted Especially for Felling Trees and Cutting Them Up, of which the following is a specification.

My invention consists in an application of steam-power to the working of a saw for felling trees and the like, whereby the saw is reciprocated and at the same time is carried to press against the surface which it is cutting with equal force at each end of its blade. Heretofore, so far as I know, while steam-power has been applied to the operation of a saw of this kind the saw while advancing into the wood has moved about a pivot during its operation, so that the advance into the wood at the point farthest from the pivot has of necessity been more rapid than at its other end, and consequently the resistance to the saw-blade has been somewhat uneven and the results have not been entirely satisfactory.

My improvement therefore consists, mainly, in giving to the saw and the parts connected with it an advancing movement into the object being cut, which is equal at all points along the blade.

My invention will be understood by reference to the drawings, in which—

Figure 1 is a plan of a mechanism embodying my invention; Fig. 2, a side elevation, and Fig. 3 an end elevation, of the machine shown in Fig. 1.

A, A', and $A^2$ are portions of a frame which is supported upon four legs $a$ in such a manner that its height above the level of the ground or the bottom of the legs may be adjusted. The bars A, A', and $A^2$ serve as tracks upon which travel the mechanism by means of which the reciprocations are given to the saw, this mechanism consisting, preferably, in an engine comprising a cylinder B, provided with a steam-chest $b$ and its connecting-pipe $b'$, and a piston of ordinary construction having a piston-rod C, carrying near its outer end a cross-head C', sliding on ways $C^2 C^3$. As shown in the drawings, the cylinder B and the ways $C^2 C^3$ are hung on the frame by means of loop-shaped straps $a' a^2$ $a^3$. The straps $a' a^2$ pass under the cylinder B, and the outer end of the ways $c^2 c^3$ are attached to the strap $a^3$. Each strap has a roller $a^4$ at each end, the rollers of straps $a'$ and $a^3$ running on the bars A A and the rollers of the strap $a^2$ running on the bar A'. The outer end of the piston-rod C is thinned and is normally bolted to the forked end of a connecting-rod $d$ by two bolts $d'$. The outer end of the connecting-rod $d$ receives a socket $d^2$, attached to the end of the saw-blade D. This socket and saw are connected to the connecting-rod $d$ by a pin $d^3$, which passes through a hole in the socket $d^2$ and also in the connecting-rod $d$. The socket is, in fact, provided with two holes at right angles to each other, so that the saw may be attached to the connecting-rod with its blade horizontal, as shown, or vertical.

By means of the above-described mechanism the saw is supported and given its reciprocating movement. Its progressive movement into the wood is given by the following means:

E E are two racks, each connected to one of the straps $a' a^3$. The outer end of each rack passes through an eye $e$, which hangs from the bar $A^2$, so as to hold the racks in a position parallel with the bars A A. By moving these racks in either direction the saw carrying and operating mechanism is correspondingly moved upon its rollers $a^4$. Movement is imparted to these racks by means of a shaft F, hung in bearings carried by the bars A A. On this shaft are mounted two pinions $f f$, each being located to engage with one of the said racks E E. On the end of the shaft F is a handle $f'$, by means of which the shaft may be turned and the racks operated to move the saw-carrying mechanism in either direction. To operate this saw-carrying mechanism automatically, the shaft F is provided with a worm-gear $f^2$, engaging with a worm $g$ upon the shaft G. This worm $g$ is keyed to the shaft G, so that while the shaft G may slide through it it will rotate with the shaft, it being held in proper position with relation to the worm-gear $f^2$ by means of a yoke-piece $f^3$, attached to a bar $A^2$ of the frame and provided with suitable bearings for the shaft. The shaft G carries at its other end a gear $g'$, which meshes with a second gear $g^2$ on a stud $g^3$, carried by a journal mounted upon a bracket $g^4$ on the way $C^2$, upon which bracket the end of the shaft G is also supported in a bearing. This stud $g^3$ also carries a ratchet $g^5$, provided with a holding-pawl $g^6$, mounted on the bracket $g^4$, so that the ratchet can only turn in one direction. A driving-pawl $g^7$ is mounted on the cross-head C' of the engine, and as it moves toward the cylinder the driving-pawl $g^7$ engages with one of the teeth of the ratchet $g^5$ and causes it to rotate, thus giving movement to the shaft G by means of the gears $g^2 g'$ and to the worm $g$ and causing a rotation of the worm-gear $f^2$, the shaft F, and its pinions $f f$, by means of which the racks E E are moved. Thus with each throw of the piston the saw-carrying mechanism is advanced progressively into the wood, the shaft G sliding through its worm $g$. When the saw has cut through the tree, the saw-carrying mechanism may be moved back into place by reversing the movement of the shaft F by hand, the driving and holding pawls being previously removed for the purpose of allowing this to be done. This may be done if the worm and its gear are of substantially the same pitch; otherwise it may be desirable to disconnect them and move the saw-carrying mechanism back by hand.

I have also provided an arm H, attached to one of the bars A and carrying an anchor-rod $h$, adjustably connected thereto, whereby the apparatus may be anchored to the tree or other object to be sawed.

When it is desired to use the saw to cut vertically instead of horizontally, the pin $d^3$ is removed, the saw is turned through an angle of ninety degrees, and one of the bolts $d$ is removed, so that the saw will sag by its own weight and feed itself into the cut which it is making. In this case of course the driving-pawl $g^7$ should be disconnected to prevent the saw-operating mechanism from being carried laterally in the manner above described.

I also prefer to mount a small pump J upon the frame in such a position that with each forward stroke of the cross-head C' it will be struck and operated to throw a spray of oil or water upon the saw, a hose $j$ being provided to lead from the pump to the saw and suitable connection also being made with water or oil supply. Any form of pump may be used for this purpose, preferably one having a spring to keep its plunger in its rearward position at all times, so that it may be engaged by the forwardly-moving cross-head.

I have described above the simplest form of my invention now known to me; but it is evident that it may be embodied in other forms, its peculiarity being that the saw-operating mechanism is moved laterally in right lines and not in the arc of a circle, so that it will progress into the tree with equal force the entire length of its stroke, its direction being at right angles to the line of reciprocation of the saw. I have shown three tracks A A A', upon which the saw-operating mechanism travels and by means of which its direction of travel is guided; but I do not limit myself to this number, for the number may be more or less.

What I claim as my invention is—

1. In a tree-felling mechanism a horizontal frame consisting of two or more parallel bars suitably supported above the ground, a saw-reciprocating mechanism located to reciprocate a saw in a direction at right angles to said parallel bars, said saw-reciprocating mechanism consisting of a steam-engine adapted to travel sidewise upon said parallel bars, two or more racks connected to said steam-engine and running parallel with said parallel bars, two or more pinions, one engaging with each of said racks and mounted upon a common shaft, and means connecting said shaft with the cross-head of said steam-engine whereby each reciprocation of said cross-head will impart a rotary movement to said shaft, as and for the purposes described.

2. In a tree-felling mechanism, a steam-engine, a saw mounted upon the cross-head of said steam-engine, a horizontal frame consisting of a series of parallel bars suitably supported, means for mounting said steam-engine on said parallel bars whereby it may be moved laterally thereon, two or more racks connected to said steam-engine and supported parallel with said parallel bars, a pinion-shaft supported by said frame at right angles to said racks and carrying pinions, each adapted to engage with one of said racks and also carrying a worm-gear, in combination with a worm slidably mounted upon a second shaft at right angles to said pinion-shaft and means for rotating said second shaft connected to and operated by the cross-head of said engine, as and for the purposes described.

3. In a tree-felling mechanism, an engine provided with a cross-head, a saw attached to said cross-head and adapted to be reciprocated thereby, a horizontal frame suitably supported above the surface of the ground and comprising two or more parallel bars, said engine being mounted upon said bars and adapted to travel thereon, two or more racks connected with said engine and suitably supported in said frame, a shaft at right angles to said bars carrying pinions each of which is adapted to engage with and operate one of said racks, said shaft also carrying a worm-gear, a second shaft mounted at right angles thereto and provided with a worm slidably mounted thereon, but adapted to rotate therewith, said second shaft carrying also a gear, in combination with a driving-pawl connected with the cross-head of said engine, a ratchet adapted to be engaged by said driving-pawl during its movement in one direction, said ratchet being suitably connected with said second shaft, whereby the movement of said ratchet will cause a corresponding movement of said second shaft, as and for the purposes described.

4. In a tree-felling apparatus an engine provided with a piston-rod, means for supporting said engine and piston-rod, a saw and a connecting-rod connecting said saw with said piston-rod, said connection comprising a forked portion and two bolts whereby said connecting-rod may be held in line with said piston-rod, one of said bolts being removable, whereby the said connection-rod may lie at an angle to said piston-rod and said saw being connected to said piston-rod by means substantially as described, whereby its blade may lie in either a horizontal or vertical position, as and for the purposes described.

5. In a tree-felling mechanism an engine suitably supported, a saw-blade connected to the cross-head of said engine, a pump mounted to be operated by said cross-head, and means for connecting said pump with a source of water-supply and with the saw-blade, as and for the purposes described.

In testimony whereof I have hereunto set my name this 26th day of April, 1901.

ALEXANDER PEREZ.

Witnesses:
GEORGE O. G. COALE,
M. E. FLAHERTY.